Dec. 28, 1965     B. F. CHOWN     3,226,719
GEOGRAPHIC COORDINATE-INDICATING NAVIGATION
APPARATUS FOR HYPERBOLIC SYSTEMS
Filed Aug. 1, 1963     5 Sheets-Sheet 1

INVENTOR
*Bruce Farrell Chown*
by
Roman J. Filipkowski
PATENT AGENT

INVENTOR
B.F. Chown
by Roman J. Filipkowski
PATENT AGENT

INVENTOR
Bruce Farrell Chown
by Roman J. Filipkowski
PATENT AGENT

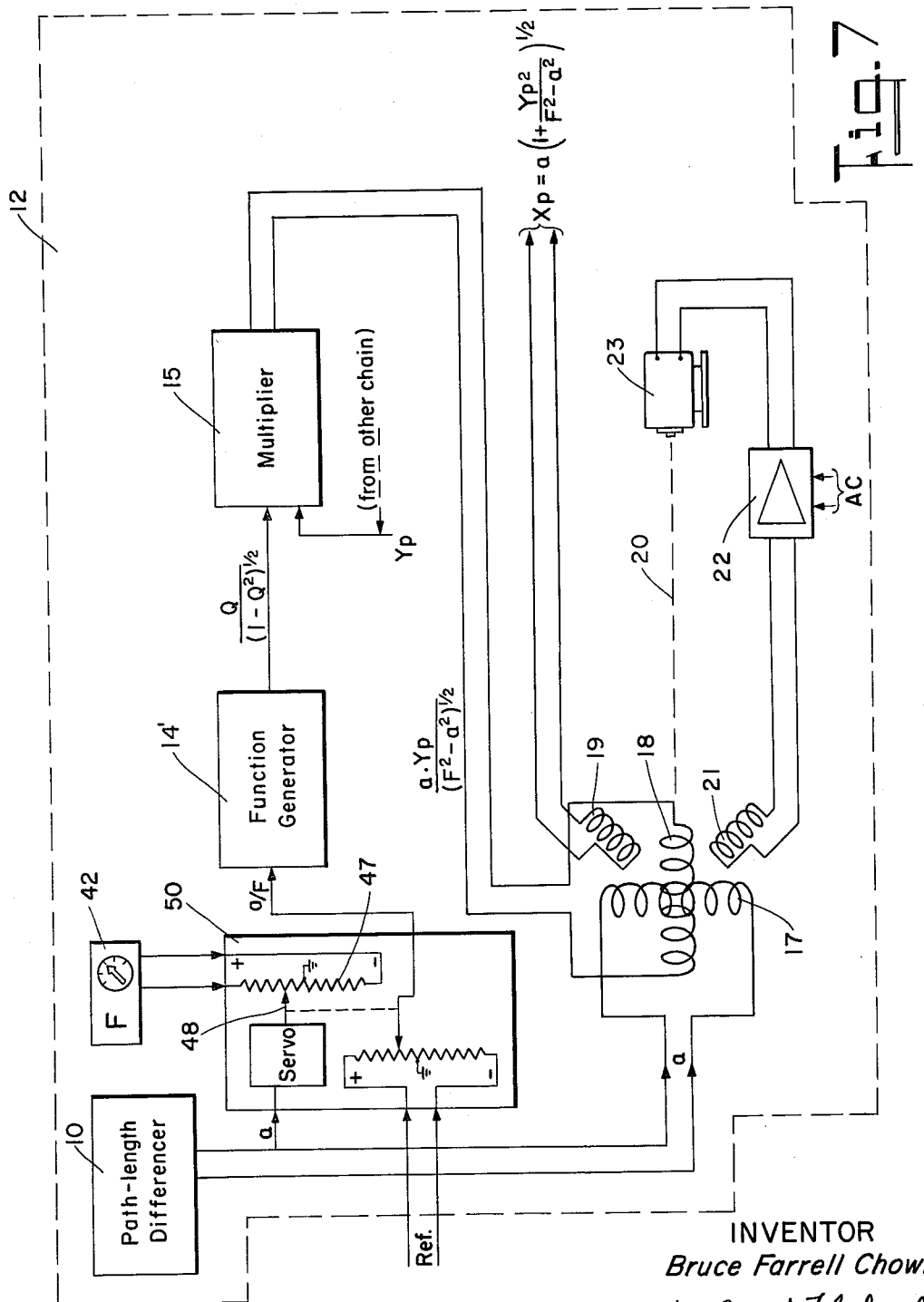

United States Patent Office 3,226,719
Patented Dec. 28, 1965

1

3,226,719
GEOGRAPHIC COORDINATE-INDICATING NAVIGATION APPARATUS FOR HYPERBOLIC SYSTEMS
Bruce Farrell Chown, Ottawa, Ontario, Canada, assignor to Computing Devices of Canada Limited, Ottawa, Ontario, Canada, a company of Canada
Filed Aug. 1, 1963, Ser. No. 299,432
11 Claims. (Cl. 343—112)

The present invention relates to navigational aids employed for guidance of craft by reference to information received from pairs of fixed stations, and more particularly concerns automatic computing means for position fixing and display of coordinates of position for use with hyperbolic navigation systems.

Such navigation systems provide information by which the position of a craft may be deduced as the intersection of two or more hyperbolic surfaces of revolution, which, on a horizontal plane such as the earth's surface become hyperbolic lattice lines each of which is the locus of points along which received signals from a pair of fixed transmitting stations bear a predetermined relationship. When three or more such reference stations are available, any selected pair of intersecting hyperbolae or hyperbolic surfaces of revolution enable determination to be made of craft position with respect to the geographical locations of the foci of respective hyperbolic lattices.

Path-length difference may be determined by measuring the difference in reception times of pulses signals originating simultaneously (or with a known time delay) from a pair of reference stations. The signals may also comprise trains of pulses or they may be continuous waves in which case a phase difference is measured between radio signals transmitted from the stations. By whatsoever means the measurement of path-length differences relative to pairs of fixed points may be accomplished, the present invention is not limited in its application to those systems employing radio signals received at a mobile craft but may be applied to navigation systems involving any other means of obtaining position on a hyperbolic lattice.

In the determination of geographic craft position by observing path-length differences for respective pairs of reference stations, one of which may be common to each pair, it has heretofore been necessary for a navigator to refer to a map upon which are drawn the relevent families of hyperbolae representing loci of points with predetermined differences in path lengths to geographic positions of the station pairs. Such navigation aids are not entirely satisfactory for use in the navigation of mobile craft, particularly high speed aircraft, owing to delays in establishing present position. While automatic computing means have heretofore been proposed for providing output information for guidance of a craft in more direct form from path length difference information these systems have not been altogether satisfactory due to their complexity and cost, and unsuitability of derived data to fix craft position thereby.

At the present time computers of the dead-reckoning type which may have continuous input of information of craft displacement, obtained by reflected wave means for example, are in common use in commercial and military aircraft navigation, employing Cartesian coordinate computing and indicating means. In order to provide input data for precisely defining craft position from a hyperbolic position-fixing system to such computing means, it has been necessary for a human observer to deduce, from map displays of hyperbolic lattice lines, the position of the intersection of that pair of hyperbolae which correspond to given path-length differences. Thereupon the position of the craft must be estimated from the map display before

2 it is manually set into the computing means. Obviously such arrangement is unwieldy and slow, the unreliable to the extent that observation and estimation may be seriously wrong through human error.

A navigation system requiring a minimum of human calculation and adjustment and providing unremittingly accurate and continuously computed solutions of present craft position is an objective much to be desired. The present invention therefore proposes to extend the usefulness of hyperbolic radio navigation systems and to this end provides means for automatically converting path-length difference information obtained by reference to two or more pairs of transmitting stations into Cartesian coordinate information based on a system of coordinate axes coincident with or in known relation to one or more pairs of geographic reference stations.

According to the invention there is provided a navigational aid for a craft adapted to be supplied with path-length difference information obtained by reference to two or more pairs of transmitting stations having known geographic positions and being in communication with the craft, comprising apparatus for continuously solving a navigational problem of position finding and producing outputs representing Cartesian coordinates defining the craft position in relation to the stations as solution of the problem. The apparatus consists essentially of a pair of cooperating chains of computing elements wherein a first computing element in each chain is arranged to be fed by an input quantity representing information of path-length difference to one pair of stations, an input quantity proportional to geographic separation of the pair of stations, and by an input quantity which is itself derived by solution of hyperbolic equations involving variables in the Cartesian coordinate schemes of representation associated with respective pairs of stations fed back from the output of the other computing chain and representing the ordinate value of the point of intersection defining the craft position of the two hyperbolae; the other computing chain of the pair comprising similar elements fed with inputs relating to the hyperbolae associated with the second pair of stations; and each chain further comprising a computing element arranged to be fed by a quantity representing angular incongruence between the axes of respective Cartesian coordinates systems of the pair of chains, to produce abcissa and ordinate quantities in relation to a new set of axes parallel with the axis of the other pair of ground stations; and a further computing element arranged to be fed from the output of the previous element and by quantities representing the displacement between the rotated axes and parallel axes, whereby to produce output representing the abscissa and ordinate quantities of craft position simultaneously for each system of Cartesian axes.

The problem-solving operation which is made automatic by the apparatus of the invention, consists in carrying forward simultaneously the solutions of two quadratic equations in two variables to arrive at an equilibrium solution satisfying both relationships for the point of intersection of the curves depicting the variables. Accordingly, the method comprises setting up an implicit relationship between the variables ($x$ and $y$) in each computing chain, and feeding the input of each chain an explicit solution for one variable as produced at the output of the other chain, so that both chains are in homeostatic relation and will find an equilibrium when the chain outputs represent the correct solutions of the variables. To this end, for a solution of the coordinates ($x$, $y$) of the point of intersection ($p$) of a pair of hyperbolae associated with separate Cartesian coordinate systems having their axes angularly displaced, the hyperbolic equations are separately and simultaneously solved for implicit relationships of $x$ and $y$ by respective computing chains and a trial value of one variable (for example the ordinate) produced as an approximation output by the other computing chain, and which has been converted into the axis system of the first chain, is continuously fed into the first chain, while the converted ordinate trial value output of the first chain is continuously fed in a similar manner into the second chain.

Specifically, each hyperbolic coordinate system has its origin centered between a pair of transmitting stations which lie at the foci of the family of conjugate hyperbolae developed between them, and the X-axis of each system lies along the line joining the pair of stations. Each hyperbola is fully identified in each system by the path-length difference of a point ($p$) occupied by the craft from each station of its system. The systems may have one intermediate station common, but this is not a necessary condition and the invention may be practiced with any hyperbolic systems provided they are geographically locatable and in range of the craft, and the angle made between lines joining their foci is known.

Preferred embodiments of the invention will be now described particularly with reference to the accompanying drawings, wherein.

Figure 6:
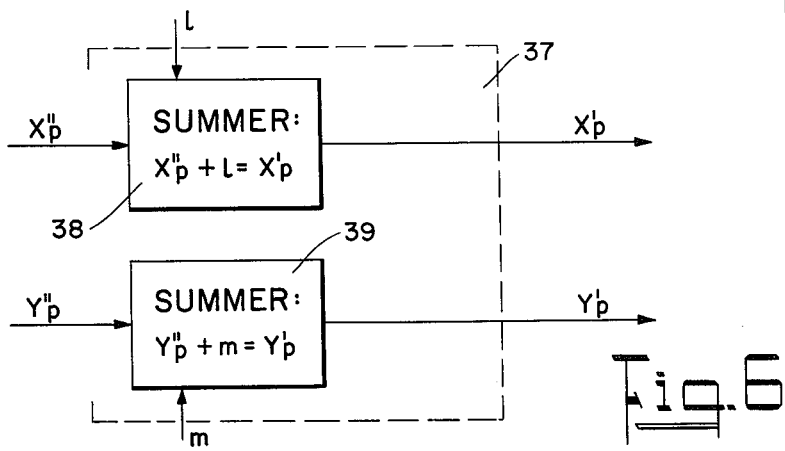
Figure 8:
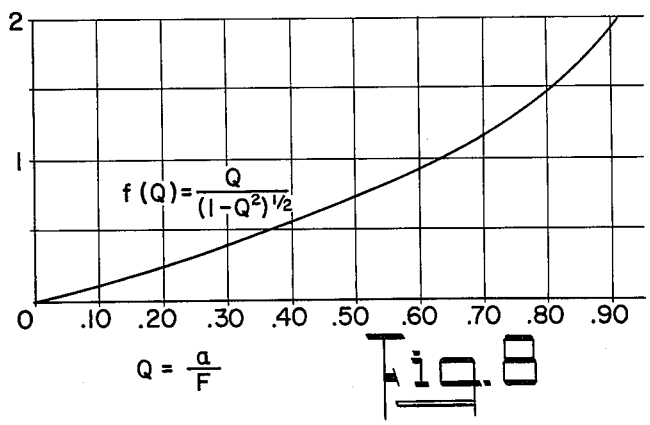
Figure 3:
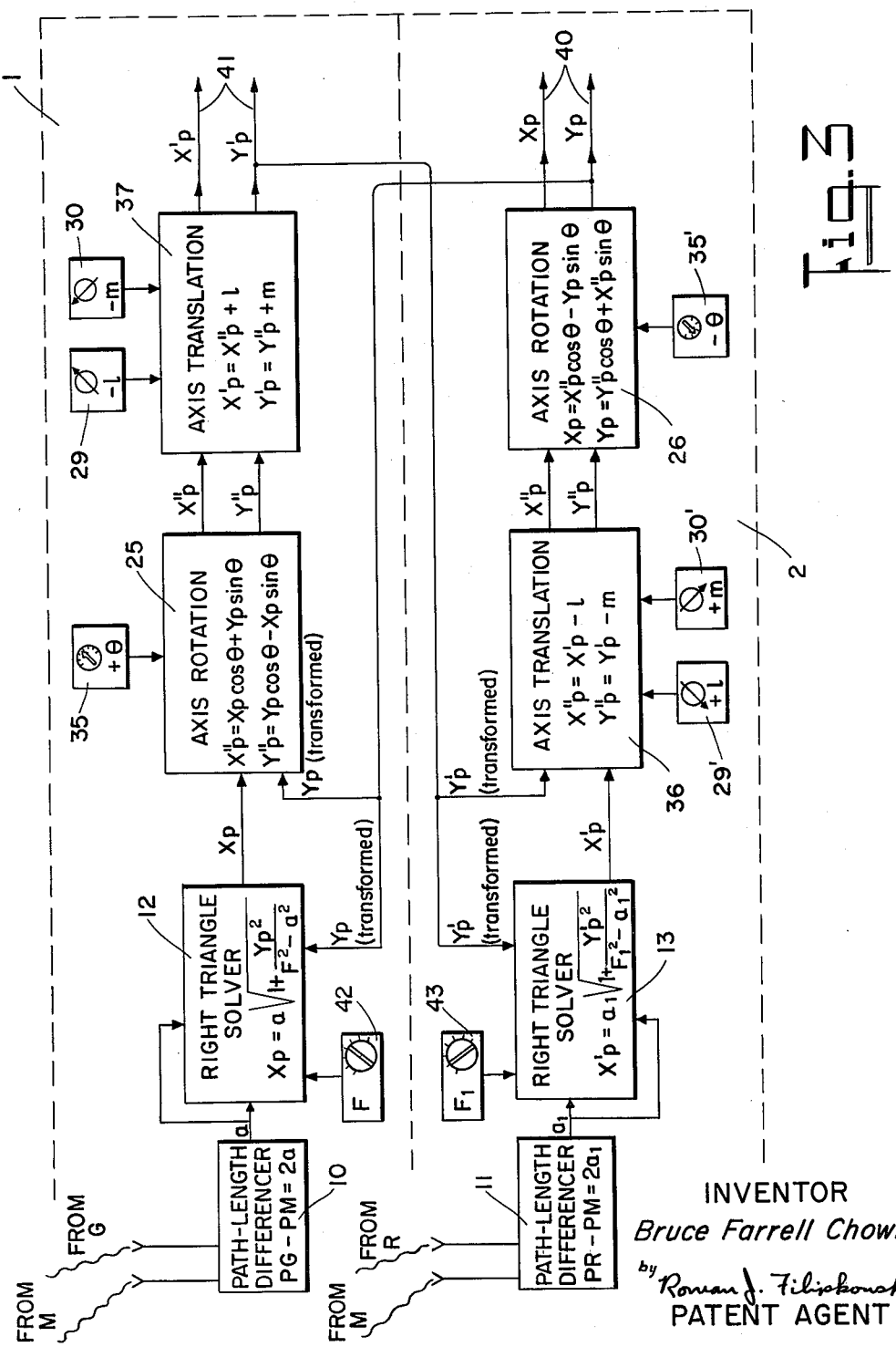
FIGURE 3 is an outline block diagram of the computing chains and the operational function of their elements.
Figure 4:
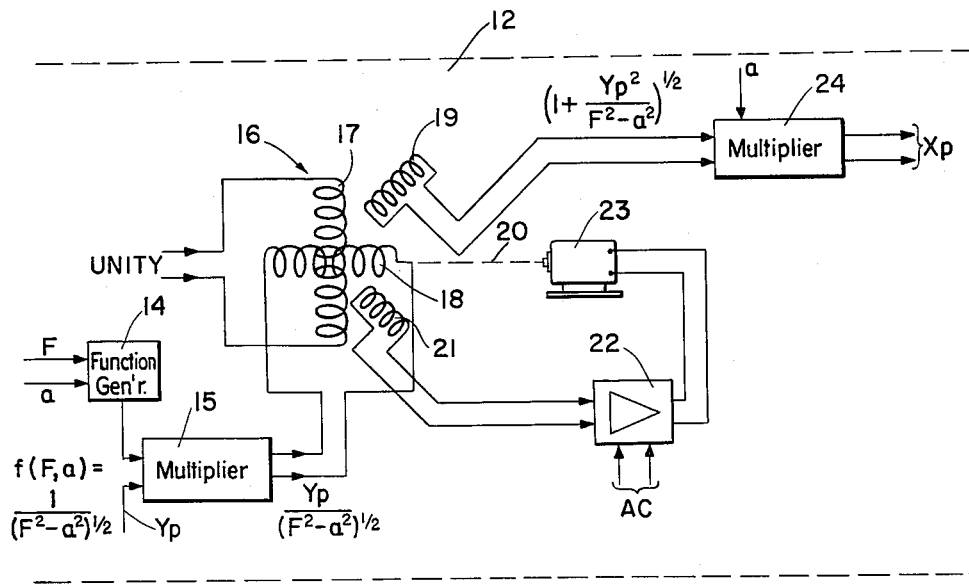
Figure 5:
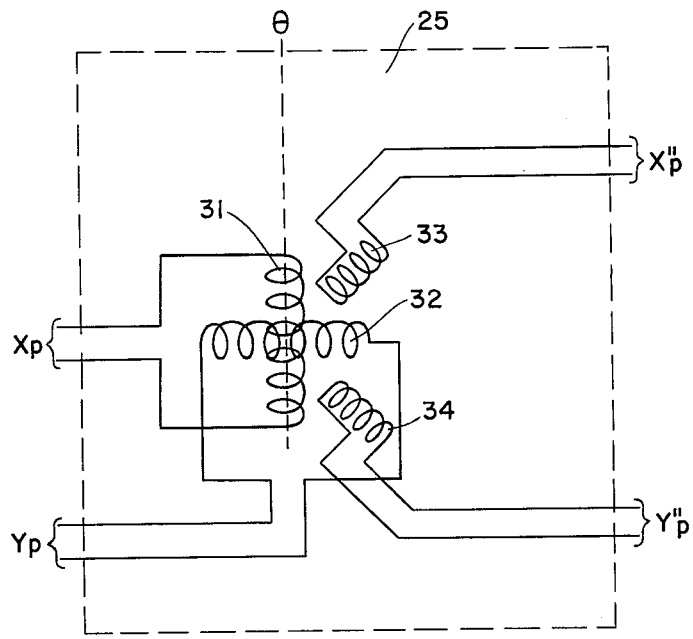

FIGURE 4, FIGURE 5, and FIGURE 6 are schematic diagrams of parts of the computing chains of FIGURE 3;

FIGURE 7 diagrams a modification of a right-triangle solver in the computing chains employing modified input information to permit adjustment for use with any hyperbolic navigation systems; and FIGURE 8 is a graph of a function generated with the modified inputs in the apparatus of FIGURE 7.

Figure 1:
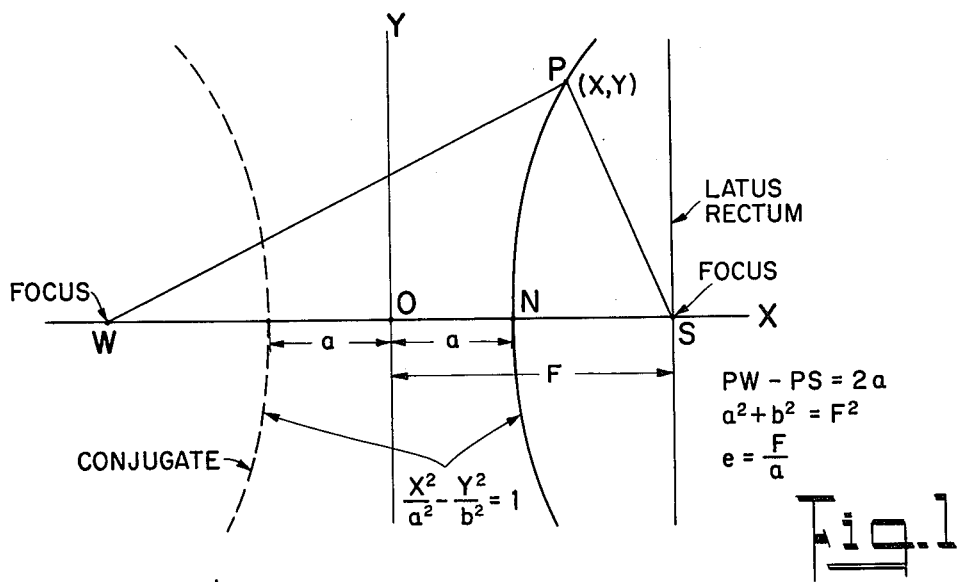
FIGURE 1 is a diagram of a plane hyperbola shown to aid in understanding certain parameters thereof relating to the invention.

Throughout this specification and in the diagrams, reference is made to plane hyperbolic lines drawn in the Cartesian diagrams. To assist in understanding the relationships to be described, FIGURE 1 shows the parameters and characteristics defining such geometric form. A plane hyperbola is a line traced by a point moving under such constraint that its distances from two fixed points have a constant difference. In the diagram, the point ($p$) lies at the distance $pW$ from one fixed point W and at distance $pS$ from the other fixed point S, points W and S being the foci of the hyperbola. Midway between W and S lies the point O. The semi-base distance F is equal to the lengths OW and OS which parameter essentially defines the family of hyperbolae associated with the foci.

The difference ($pW - pS$) is directly shown by the intersection of the hyperbola at N along the line WS, and is obviously equal to $WN - NS$. The eccentricity "$e$" of a plane hyperbola is the ratio $OW/ON$ and if the distance ON is set equal to the parameter $a$, $$e = F/a \qquad (1)$$

When "$a$" is varied by increments, a family of pairs of hyperbolic lattice lines may be drawn between W and S, and when "$a$" is zero, one pair of hyperbolae lie along the perpendicular bisector of a line joining W and S. The latter is designated the X axis and the bisector is along the Y axis, with origin at O. When the eccentricity "$e$" is larger than about 1.2, the hyperbolae are not strongly curved, and are preferred in providing fixes with crossing lattice lines of another hyperbolic system having its axes angularly rotated and displaced with respect to the first system.

Figure 2:
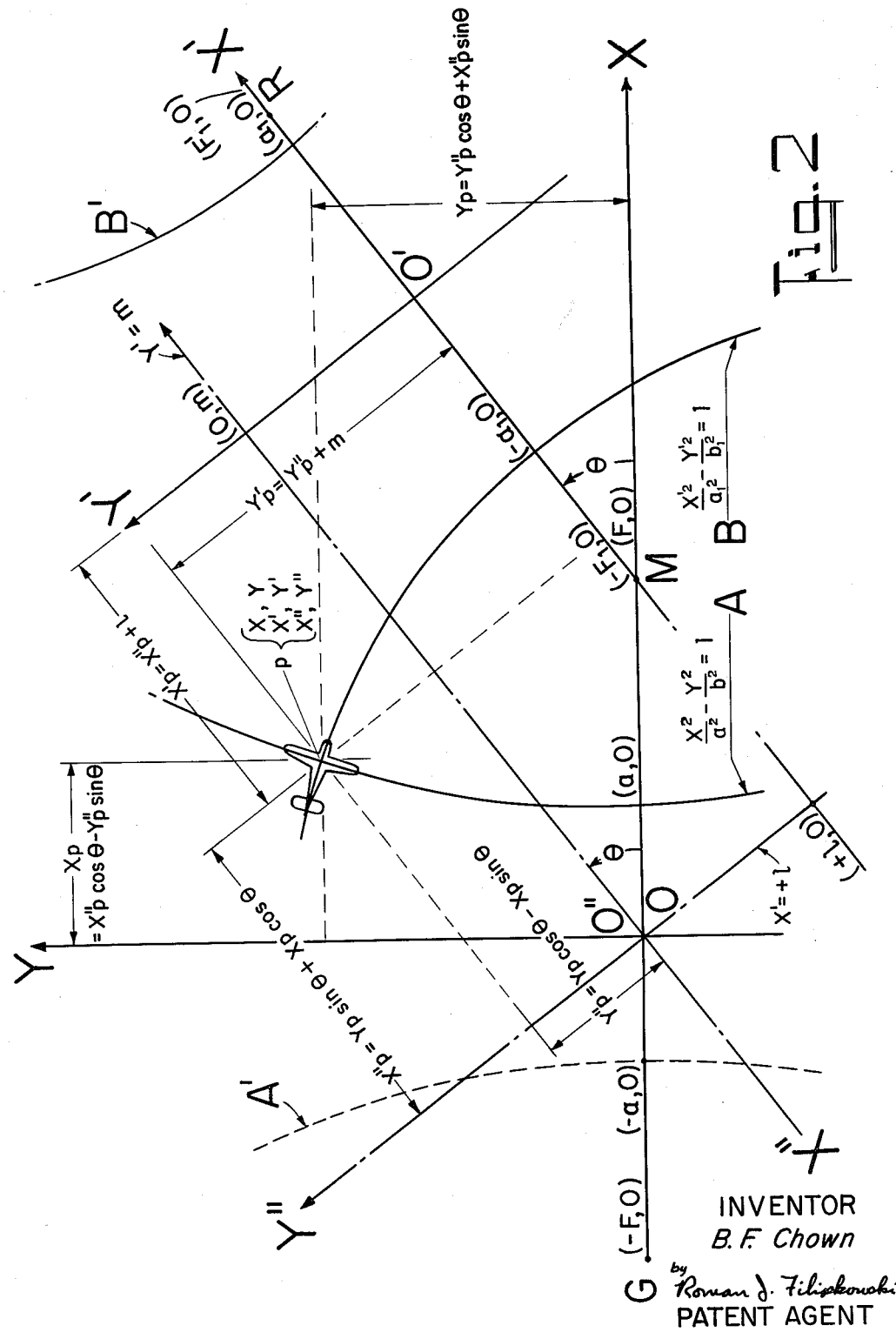
FIGURE 2 is a diagram showing two hyperbolic systems and associated Cartesian coordinate axes, as well as translated axes illustrating the relationships computed according to the invention.

The system of FIGURE 2 illustrates a geographically spaced pair of slave transmitting stations designated G (green) and R (red) which are controlled to cooperate with a master station M. These three stations define foci of a pair of families of hyperbolae having foci G, M and R, M respectively, the focus M being common. The line GM is drawn along the X axis of a first set of Cartesian coordinate axes XY having their origin O between G and M. The line MR lies along the X' axis of a second set of Cartesian coordinate axes X'Y' having their origin at O' between M and R. The line MR forms the angle RMX with the line GM, designated as angle $\theta$. Preferably $\theta$ should lie between about 30° and about 90° for optimum accuracy in position determinations in the region of principal overlap.

The diagram further includes a set of rotated Cartesian coordinate axes X''Y'' having origin O'' coincident with O and axes parallel with X', Y'. The intercept of the X'' axis produced on the Y' axis is $m$ and the intercept of the Y'' axis produced on the X' axis is $l$ corresponding to translation of the X'Y' axis to place the origin O' at O, which point has coordinates ($l, m$) in the X'Y' coordinate system.

Since the quantities $l, m$ are defined geographically by the known positions of the three stations M, G, R, and the angle $\theta$ is similarly known, the several relationships defining the position of point ($p$) occupied by a vehicle such as an aircraft relative to each Cartesian coordinate system and to each family of hyperbolae are readily established as diagrammed and set out by the relationships shown.

It is to be understood that hyperbolic surfaces of revolution in space are generated about the pairs of stations, the intersection of each hyperboloid with a horizontal plane producing a plane hyperbola. When the plane is at ground level the relationship described precisely apply. However, at the usual heights of aircraft and with spacings of G, M and R of hundreds of miles, the error in assuming that the aircraft is in the plane of the stations will be tolerable or even negligible.

The point ($p$) lies along a first hyperbola (A) in the XY system having hyperbolic lane number "$a$," and along an intersecting hyperbola (B) in the X'Y' system having a hyperbolic lane value "$-a_1$." The latter quantities are derived by any suitable means, as for example by means of "Deccometer" measurement apparatus at the craft, which continuously and automatically produces as analogue quantities, the relative values of the lane numbers in respect of the systems wherein the F values of geographically known station pairs G, M, and R, M, have been manually inserted in proportional analogue representation together with the angle $\theta$ between the X-axes of the two base lines, in the position-computing apparatus to be described.

The general equation for the hyperbola designated (A) in FIGURE 2 in terms of its X, Y axes is:

$$\frac{x_p^2}{a^2} - \frac{y_p^2}{b^2} = 1 \qquad (2)$$

and that for the hyperbola B expressed in terms of its axes X', Y':

$$\frac{(x'_p)^2}{a_1^2} - \frac{(y'_p)^2}{b_1^2} = 1 \qquad (3)$$

Relationships (2) and (3) may be restated:

$$x_p = \pm \sqrt{a^2 + \left(\frac{a}{b}\right)^2 y_p^2} \qquad (4)$$

$$x'_p = \pm \sqrt{a_1^2 + \left(\frac{a_1}{b_1}\right)^2 y'_p^2} \qquad (5)$$

The ratio $a/b$ for a plane hyperbola is intrinsically related to the semi-base distance F according to the relation:

$$a^2 + b^2 = F^2 \qquad (6)$$

so that (4) and (5) may be rewritten:

$$x_p = \pm a\sqrt{1 + \frac{y_p^2}{F^2 - a^2}} \qquad (7)$$

and:

$$x'_p = \pm a_1 \sqrt{1 + \frac{y'^2_p}{F_1^2 - a_1^2}} \quad (8)$$

It will readily appear that (7) and (8) express implicit relations between $x_p$ and $y_p$, and between $x'_p$ and $y'_p$ since the information $a$, $a_1$, F, and $F_1$ is known.

Since the point $(p)$ is common, (7) and (8) may be solved, to yield explicit solutions of $(x, y)_p$ and of $(x', y')_p$, as four sets of relations involving two pairs of unknowns related to the known quantities $l$, $m$, and $\theta$ are available by transformation of axes as will be described hereinafter.

According to the invention, inputs are supplied to a pair of computing chains diagrammed in FIGURE 3, these inputs comprising the analogues of the known values $(a)$ and $(a_1)$, respectively, and the fixed quantities F and $F_1$. The outputs 41 and 40 of respective upper and lower computing chains 1 and 2 each represent a solution for the position of point $(p)$ in terms of Cartesian coordinates of respective axis systems. It will be noted that the ordinate quantity, $y'_p$ is fed back from the output 41 of chain 1 as input to the associated chain 2, while quantity $y_p$ is similarly fed back from the output 40 of chain 2 as input to chain 1.

The general scheme of computation, to be described hereinafter in detail, involves initially proceeding with derivations of implicit solutions of $x_p$ and $x'_p$ defined in (7) and (8) above, in respective computing chains. The abscissa quantity is representable as the vector sum, at 90°, of the quantity (unity) summed with the quantity $$\frac{y}{\sqrt{F^2 - a^2}}$$

The magnitude of this vector sum may be derived as the output of an analogue computing element such as that comprising an induction resolver of two-phase to two-phase type, having a pair of primary windings at right angles respectively fed by electrical currents in proportion to the magnitude of each vector quantity and having its pair of secondary windings at right angles to each other and rotatable as a unit with respect to the primary pair, one of the secondaries feeding a signal to a servo drive to rotate the secondary pair until that winding has a null signal induced therein, in which position the other secondary winding generates an output quantity representing the vector sum.

It is to be noted that the ordinate quantity $y$ is present as a multiplier of one of the vectors being added, and is applied to modify the input to one primary winding by a suitable multiplying device, being itself derived as output (and suitably adjusted for translation and rotation of axes) of a similar second induction resolver operating in another axis system. The second resolver is fed with vector quantities for solving in a like manner the implicit relations between $x'$ and $y'$ in the X', Y' axis system and provides the aforesaid $y$ analogue quantity by transformation from the $y'$ output of the second computational chain. The transformation is a two-step process which effects the additions of the abscissa and ordinate quantities corresponding to the separation of the origin O' from the origin O, and which effects the rotation of the translated X', Y' axes about O into parallelism with the X, Y axes by the apparatus now to be described in terms of operations shown in FIGURE 3.

It may be shown by analytic geometry that the rotation of the axes X, Y about O through the angle ($\theta$) provides transformed axes X'', Y'' having origin O'' coincident with O and in which the point $(p)$ has the coordinates $(x'', y'')_p$:

$$x''_p = x_p \cos \theta + y_p \sin \theta \quad (9)$$

$$y''_p = y_p \cos \theta - x_p \sin \theta \quad (10)$$

Since the origin O' of the X', Y' Cartesian coordinates system lies at the point $(-l, -m)$ of the X'', Y'' axis system it may be shown that:

$$x'_p = x''_p + l \quad (11)$$

and that $$y'_p = y''_p + m \quad (12)$$

Similarly, as in the relationships (9), (10), (11) and (12), the coordinates $(x', y')_p$ in (8) are computed in the X', Y' coordinate system by translation through $(l, m)$ and rotation of the X, Y axes through ($\theta$) whence:

$$x''_p = x'_p - l \quad (13)$$

and $$y''_p = y'_p - m \quad (14)$$

and on rotation:

$$x_p = x''_p \cos \theta - y''_p \sin \theta \quad (15)$$

$$y_p = y''_p \cos \theta + x''_p \sin \theta \quad (16)$$

The several relationships stated make possible the simultaneous solutions of pairs of implicit relations in two variables, $(x, y)_p$ and $(x', y')_p$, namely the relationships in (7),(9),(10) and (11) in one chain, and the relationships (8),(13),(14) and (15) in a second chain. By appropriate arrangement of the computing apparatus for carrying out the solutions simultaneously in one network comprised of two such computing chains initially fed by appropriate parameters F, $F_1$, $a$, and $a_1$, and each having inputs from the other's output, a complete solution by equilibration of the network may be produced.

Referring to the diagrams, FIGURES 3 to 7, the scheme of computation according to the invention may be understood in detail and the expression of the relationships made clear. By known path-length difference measurement means 10, 11, designated "path-length differencers," signals received from stations G and M, and from stations M and R at the craft carrying these means, yield information of the intercept distances $a$, $a_1$ of respective hyperbolae (A) and (B) shown in FIGURE 2. In certain equipment the output quantity derived itself represents a lane number, useful in correlating position by map aids and to identify a hyperbolic curve among a family that may be drawn between a pair of stations with predetermined separations. Preferably, apparatus 10, 11 each comprises an automatic equipment continuously yielding outputs as electrical analogues (voltages and currents) proportional to parameters $a$ and $a_1$, such as "Deccometers" which are believed to be sufficiently well known that further description of them need not be included.

Each path-length differencer's output respectively is fed to a computing element 12 or 13 of respective chains 1 and 2, each of which is fed the requisite parameters $y_p$, $a$, and F, or $y'_p$, $a_1$ and $F_1$, so that the output quantities respectively proportional to abscissae $x_p$ or $x'_p$ according to relations (7) or (8) may be derived. Each computing element 12 or 13 essentially performs a vector-summing operation, i.e. it derives the resultant magnitude of two input vectors at right angles, or in other words, derives the hypotenuse of a right-angled triangle whose sides have the lengths representing the inputs.

Examination of the form of relationship in (7) or (8) reveals that the required inputs to resolver element 16 of the triangle solver 12 of computing chain 1 in FIGURE 4 are themselves the square roots of each of the two terms summed under the square root sign. One winding 17 of the primary pair is therefore fed with the quantity (unity). A function generator 14 is supplied with F and $(a)$, to produce the function:

$$f(F, a) = \frac{1}{(F^2 - a^2)^{1/2}} \quad (17)$$

and is fed into a multipler unit 15. The latter is fed with the multiplicand $y_p$, and produces the analogue:

$$\frac{y_p}{(F^2 - a^2)^{1/2}}$$

which is fed to the other winding 18 of the primary pair. The quantity $y_p$ is a trial value obtained from the output of chain 2, which value is quickly revised automatically by the operations of the chains as will be apparent hereinafter.

One secondary winding 19 of the output pair 19, 21 which are orthogonally related and jointly rotatable about axis 20 with respect to the primary pair, is connected to deliver its output, proportional to:

$$\pm \left[1 + \frac{y^2_p}{F^2 - a^2}\right]^{1/2}$$

as input to a multiplier 24, which derives a product of quantity $\underline{a}$ with the input. Another secondary winding 21 feeds a signal to amplifier 22 of a null-seeking servo in which drive motor 23 fed from the output of the amplifier is coupled to the rotor and provides torque tending to place the winding 21 in a position whereat nil voltage is induced in the winding, whenever the rotor is not in the correct position for the desired solution output from winding 19.

The computation may be shown to be valid whether the quantity $\underline{a}$ fed in jointly to function generator 14 and to multiplier 24 has a positive or negative sign, denoting hyperbolae to right or left of the origin; hence the output $x_p$ automatically carries the correct sign relating it to its axis system.

Referring also to FIGURE 5, apparatus 25 which is fed by $x_p$ and $y_p$ and into which the quantity $(-\theta)$ is preset by unit 35, derives the pair of quantities $x''_p$ and $y''_p$ according to the Equations 9 and 10. A similar apparatus 26 fed by the pair of quantities $x''_p$ and $y''_p$ in chain 2 derives transformed quantities $x_p$ and $y_p$ at output 40. Apparatus 25 simply consists of a resolver having a pair of primary windings 31 and 32 on a rotor (not shown) which is orientable with respect to the pair of secondary windings 33, 34. By the nature of the apparatus, each secondary winding will produce a voltage output proportional to the currents in both primary windings and in accordance with the spatial angular relation of the primaries to the secondary winding, as set in by manual devices 35 or 35'.

Computing elements 37 and 36 of chains 1 and 2 respectively perform addition or subtraction operations, as outlined in FIGURE 6 for element 37 performing the computations expressed in (11) and (12). Similarly, element 36 performs the computations expressed in relations (13) and (14).

It will be readily seen that the computing elements 25 and 37 carry out the steps of axis rotation and of axis translation in the order stated, whereas in chain 2 the order of computing steps is reversed, so that axis translation precedes rotation. By so arranging the computing chains, the setting devices 29, 30 and 29', 30' are concerned only with supplying the quantities $l$, $m$, and $-l$, $-m$. Accordingly, a means may readily be designed in a simple manner to produce the two setting quantities with positive and negative signs, representing geographical separation of the X, Y and the X', Y' axes in one axis system.

Obviously $y_p$ and $y'_p$ as initially computed will be greatly in error so that the intermediate quantities throughout the chains will also be in error. This situation occurs only on initiating the position-finding computations, as whenever the apparatus is first brought into operation with all parameters correctly supplied, and is only temporary. Provided the initial values $y_p$ and $y'_p$ lie anywhere within a broad range encompassing all possible values these ordinates may have, the system may be arranged to quickly and automatically find an equilibrium such that these outputs satisfy the problem solution, i.e., the ordinates of craft position in respective Cartesian coordinate systems are correct. Once this correct value is produced, and as long as inputs $a$ and $a_1$ hold steady, the outputs at 40 and 41 will be steady and unvarying.

As the aircraft (or other craft equipped with the position-finding apparatus of the invention) moves over the region served by the ground stations, new values of $a$ and $a_1$ will be fed in, and the system will respond to these, keeping the outputs at 40 and 41 consistent with craft position. So long as the craft remains in the region no manual adjustment of input devices 42, 43, 35, 35', 29, 29', or 30, 30' will be necessary. On changing to any other pair of stations than those described hereinbefore, appropriate changes must be made in the apparatus settings. Such changes will be required only infrequently in view of the great areas served usually by a set of typical stations such as G, M and R.

According to an alternative embodiment diagrammed in FIGURE 7, the quantities $F$ and $\underline{a}$ which have been shown in FIGURE 4 to be introduced into function generator 14 and multiplier 15, may be modified to permit a simpler generator 14' to be employed, and other advantages to be realized as will become apparent as the description proceeds.

As has been set out before, the path-length difference information $(a)$ for a given hyperbola is inherently associated with the fixed quantity F, the semi-base distance (see FIGURE 1). By dividing these distance parameters, a dimensionless ratio "Q" may be established:

$$\frac{a}{F} = Q \qquad (18)$$

This ratio will have a range from zero (at the origin) to about 0.9 over the entire family of hyperbolae having constant $F$ and which are not strongly curved, as preferred in position-finding by conventional map "fixes." It is also interesting to note that this ratio is the reciprocal of eccentricity "$e$." Such ratio lends itself more directly to derivation as an output produced by tapping a potentiometer in a function-generating element 50. The element may comprise the potentiometer 47 which is supplied across its terminals by a voltage corresponding to the analogue of $F$ and arranged to be tapped by a servo-driven tapping point 48 so that the latter finds a potential balance with respect to the input $\underline{a}$ of either sign. The tapping point is mechanically paralleled with a further potentiometer 49 having a reference supply across its terminals so that the potential at 49 expresses the analogue $a/F$.

The identity:

$$\frac{a}{(F^2 - a^2)^{1/2}} = \frac{Q}{(1 - Q^2)^{1/2}} = f(Q)$$

may be directly proven from (18). The graphical representation of the function $f(Q)$ appears in FIGURE 8. The sign of $f(Q)$ is the same as the sign of Q thus permitting operation with conjugate hyperbolae.

The multiplier unit 24 required in FIGURE 4 to produce a product with quantity $(a)$ is not required in the apparatus of FIGURE 7, thereby simplifying and reducing cost of apparatus.

It is to be understood that the algebraic signs of the axes X, Y and X', Y' should be consistent, i.e., the ordinates should be of the same sign when extending to the same side of a line joining the origins. Provided the "$a$" inputs are correctly derived, i.e., carry positive sign for hyperbolae lying to the positive abscissa side of their Y axis, and the signs $l$ and $m$ are consistent with the meaning of the settings for the computational chains allocated to respective Cartesian axes, the abscissa and ordinate outputs in each axis system will be algebraically correct. It is to be particularly noted that the semi-base distance "F" carries no sign, and that angle $\theta$ is negative in the clockwise sense according to the conventions of analytic geometry.

In the situation that the X, Y and X', Y' axes have a common origin and are incongruent, no computation of the form described for units 36 and 37 would be required, so that the outputs of these units are their inputs. In the special case that angle $\theta$ is 90°, the (cos $\theta$) terms vanish so that the outputs of units 25 and 26 simply become the inputs, associated with appropriate signs according to the relations (9), (10), (15) and (16). When one axis system lies along the geographic North-South line, the outputs of one chain will be directly computed as distances North or South, and East or West of the origin of that system. When both axis systems are geographically aligned and at 90°, a greatly simplified and convenient apparatus is realized.

It will now be clear that apparatus constructed according to the invention as described hereinbefore may be employed to produce by wholly automatic operations the ordinate and abscissa quantities for the position of a craft carrying it in a Cartesian coordinate grid based on either pair of two pairs of stations of a hyperbolic navigation system. Such position information may be fed into known navigation computing and display devices for establishing positions and distances to any desired geographic reference position.

I claim:

1. Apparatus for use in the navigation of mobile craft for position finding with radio position finding systems of the hyperbolic type, said apparatus being adapted to receive a pair of inputs representative of path-length differences from said craft to first and second pairs of geographic reference points, and having settable means for providing a second pair of inputs representative of Cartesian coordinates of an origin between said first pair of reference points with respect to a first axis which is a line joining the second pair of said reference points and to a second axis which is the right bisector of said line, settable means providing an input representative of the angle contained between lines joining respective pairs of said points and a pair of settable means providing inputs representative of the semi-base distances of said pairs of reference points, and computing means responsive to all of said inputs conjointly for indicating the geographic position of said craft.

2. The combination set forth in claim 1 wherein one geographic reference point is common to each pair.

3. Apparatus for use in the navigation of a mobile craft with position finding radio systems of the hyperbolic type comprising means for providing a pair of signals representative of path-length differences from said craft to two pairs of geographic reference points, settable means for providing: a pair of signals representative of the coordinates of a geographic reference point midway on a line between one pair of said reference points in a Cartesian grid system based on the other pair of said positions; a signal representative of the angular incongruence between said line and an axis of said grid system; and a pair of signals representative of the semi-base distances of the pair of hyperbolae intersecting in the craft position and based on respective pairs of said stations; and computing means responsive to all of said signals jointly for continuously indicating the position of said craft in said grid system.

4. The combination set forth in claim 3 wherein one reference point of each pair is common.

5. Apparatus for use in the navigation of a mobile craft with position finding radio systems of the hyperbolic type employing two pairs of geographic reference stations, comprising a first and a second computation chain, each chain having means for receiving an input representative of the intercept of a hyperbola of a pair of hyperbolae intersecting in the craft position on the abscissa axis of a Cartesian grid system based on a respective pair of said geographic reference stations and having settable means providing an input representative of the semi-base distance of said hyperbolae, settable means providing inputs respectively representative of the ordinate and abscissa distances of the origin of one Cartesian grid system in the other Cartesian grid system, and settable means for providing an input representative of the angle formed between like axes of respective Cartesian grid systems, each chain deriving position coordinates of said craft from its inputs in respect to its Cartesian grid system and providing transformed outputs of position coordinates of said craft in respect of the other Cartesian grid system as input to the other chain for jointly continuously indicating an equilibrium solution of craft position in each grid system.

6. The combination of claim 5 wherein one of the stations of each pair is common.

7. The combination of claim 5 wherein the origins of respective grid systems are common.

8. The combination of claim 7 wherein the angle between abscissae of respective grid systems is 90°.

9. Apparatus for use in the navigation of a mobile craft by hyperbolic guidance systems employing two pairs of geographic reference stations, wherein a pair of means produce outputs which are analogues of the intercepts "$a$" of the two hyperbolae intersecting in the craft position on respective base lines joining each pair of said stations, comprising the combination of a pair of means supplying said outputs as inputs to said apparatus, a pair of settable means producing analogues of the semi-base distances "$F$" of said pairs of stations, as inputs, a pair of computing chains employing respective ones of said inputs for producing an abscissa quantity $x_p$ as an implicit relationship with a function of said inputs and the ordinate quantity $y_p$ designating craft position ($p$) in respective Cartesian grid systems having abscissa axes along said base lines and orinate axes as right bisectors of said base lines according to the relation:

$$x_p = a\left[\frac{Y^2_p}{F^2-a^2}\right]^{1/2}$$

and further comprising settable means providing inputs representative of these coordinates of the origin of one Cartesian grid system in the other grid system, settable means providing inputs representative of the angle contained between said base lines, and means responsive to said coordinate inputs and to said angle input for producing from said relation by transformation of said axes a pair of explicit solutions of the ordinate and abscissa quantities of said craft position for each Cartesian grid system and means supplying the ordinate solution output from each computing chain as the input representing $y_p$ in said relation to the other chain.

10. The combination set forth in claim 9 wherein the origins are common.

11. The combination set forth in claim 9 wherein said base lines cross at 90° and said origins are common.

References Cited by the Examiner

UNITED STATES PATENTS 2,530,428  11/1950  Gray.
3,020,545   2/1962  Losher.

CHESTER L. JUSTUS, *Primary Examiner*.